(12) United States Patent
Boucher et al.

(10) Patent No.: US 7,110,908 B2
(45) Date of Patent: Sep. 19, 2006

(54) PADDLEWHEEL SPEED CORRECTION

(75) Inventors: Stephen G. Boucher, Amherst, NH (US); Frederic S. Boericke, II, Mount Vernon, NH (US)

(73) Assignee: Airmar Technology Corporation, Milford, NH (US)

( * ) Notice: Subject to any disclaimer, the term of this patent is extended or adjusted under 35 U.S.C. 154(b) by 206 days.

(21) Appl. No.: 10/677,102

(22) Filed: Oct. 1, 2003

(65) Prior Publication Data

US 2004/0123662 A1 Jul. 1, 2004

Related U.S. Application Data

(60) Provisional application No. 60/419,391, filed on Oct. 17, 2002, provisional application No. 60/415,870, filed on Oct. 3, 2002.

(51) Int. Cl.
*G01F 19/00* (2006.01)

(52) U.S. Cl. .......................... 702/142; 701/21

(58) Field of Classification Search ................ 702/142, 702/78, 143, 182–185; 701/21
See application file for complete search history.

(56) References Cited

U.S. PATENT DOCUMENTS

| | | | |
|---|---|---|---|
| 4,555,938 A | 12/1985 | Boucher et al. | |
| 4,836,020 A | 6/1989 | Boucher | |
| 4,898,020 A | 2/1990 | Vassiliou | |
| RE33,982 E | 7/1992 | Boucher | |
| 5,187,978 A | 2/1993 | Tendler | |
| 5,369,360 A * | 11/1994 | Amyot | 324/174 |
| 5,544,076 A * | 8/1996 | Wiggerman et al. | 702/142 |
| 5,606,253 A | 2/1997 | Boucher et al. | |

* cited by examiner

*Primary Examiner*—Edward Raymond
(74) *Attorney, Agent, or Firm*—Hamilton, Brook, Smith & Reynolds, P.C.

(57) ABSTRACT

A speed sensor for a marine vessel includes a correction circuit to correct any sensor non-linearities so that the sensor produces an output with a pulse stream having a constant pulse rate, and reduces the pulse-to-pulse variations of the pulse stream. The circuit can standardize the pulse stream to have a frequency corresponding to a standard rate.

30 Claims, 11 Drawing Sheets

PADDLEWHEEL CORRECTION CIRCUIT WITH ANALOG OUTPUT

UNCORRECTED PADDLEWHEEL CIRCUIT

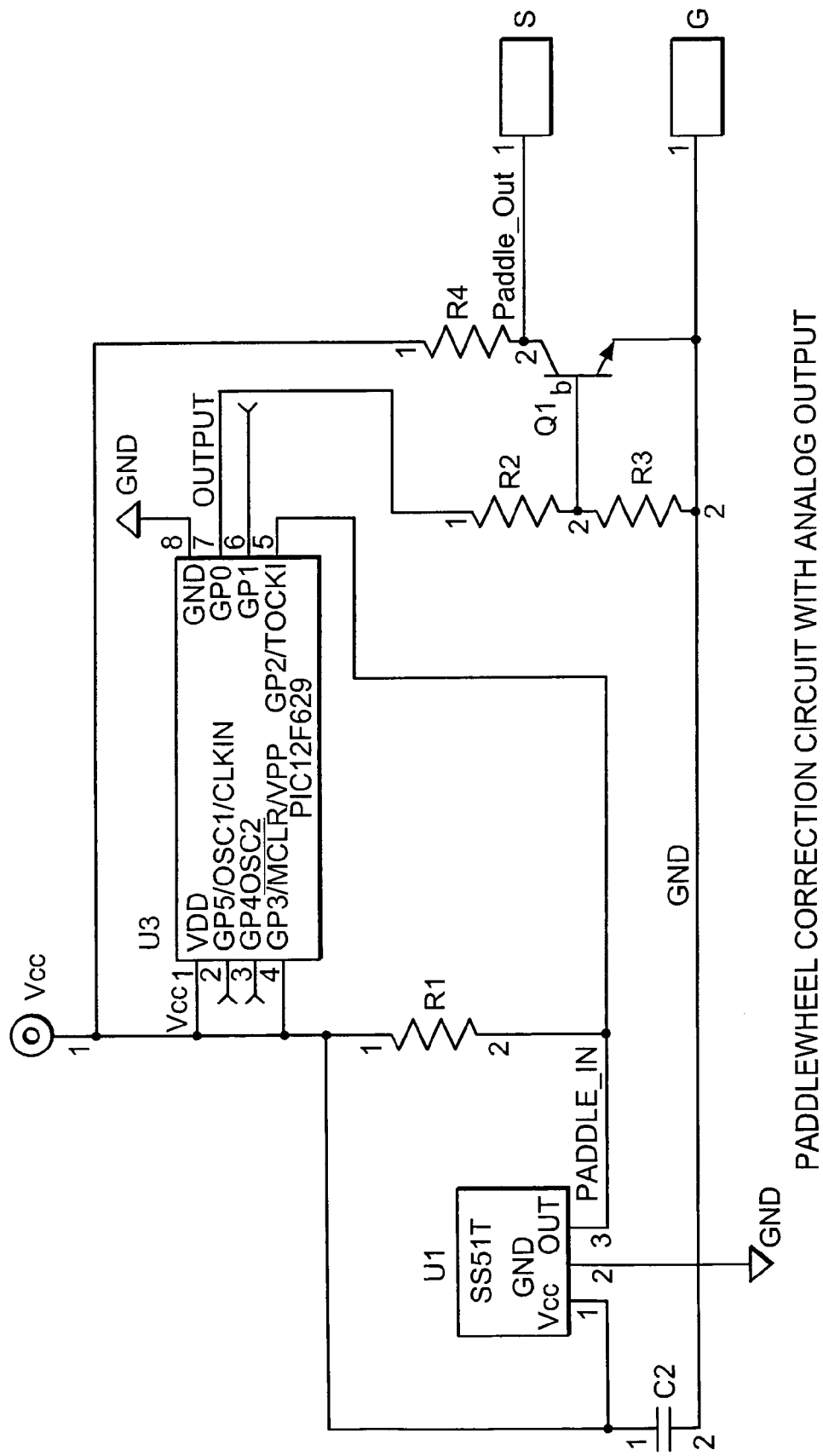
FIG. 6B  PADDLEWHEEL CORRECTION CIRCUIT WITH ANALOG OUTPUT

PADDLEWHEEL CORRECTION CIRCUIT WITH DIGITAL OUTPUT

PADDLEWHEEL SPEED CORRECTION

RELATED APPLICATIONS

This application claims the benefit of U.S. Provisional Application No. 60/419,391, filed Oct. 17, 2002 and U.S. Provisional Application No. 60/415,870, filed Oct. 3, 2002, the entire teachings of which are incorporated herein by reference.

BACKGROUND

Paddlewheel-type marine speed sensors are known in the art. There are typically two types of speed sensors, a transom mount speed sensor and a thru-hull speed sensor. The transom mounted speed sensor mounts to the transom of a marine vessel, while the thru-hull speed sensor mounts through an opening in the hull of the marine vessel. Each type of these sensors have paddles or blades which are asymmetric in shape and formed of magnetized amorphous magnetic material, such as barium ferrite. In some embodiments, these speed sensors can be combined with a depth sensor, a temperature sensor, or a combination of both depth and temperature.

In operation, as the marine vessel-traverses a body of water the paddlewheel rotates about an axis which is transverse the direction of travel. A change in the magnetic field emanating from the magnetized paddles is sensed by a coil or Hall-effect device located adjacent the paddlewheel. Upon sensing the change in the magnetic field, the Hall-effect device generates an electrical signal whose frequency is directly proportional to the rotational speed of the paddlewheel which in turn should be the same as the speed of the vessel. The vessel's speed is then displayed to the vessel's operator, typically in the cockpit of the vessel's helm.

One problem with paddlewheel-type marine sensors is they are inherently non-linear devices. There are several causes of non-linearity, for example; 1) as the vessel speed decreases and the distance from the "leading edge" increases, the boundary layer near the marine sensor becomes thicker causing the sensor to measure less than the true speed of the vessel. 2) the drag induced by fluid recirculation in the paddlewheel cavity is also not linear with speed since the force applied to the paddles is proportional to the square of the speed; 3) rotational friction from the shaft bearings supporting the paddlewheel is also not linear; and 4) the angle of attack of the vessel hull changes with speed, that is the angle at which the hull cuts through a body of water causing the sensor to misread the actual speed; 5) hull displacement changes with speed, that is the portion of the hull that is in the water changes with speed, i.e., as the vessel's speed increases less hull remains in the water and when the vessel's speed decreases more hull is in the water.

Various techniques have been devised in an attempt to improve the high-speed performance of paddlewheel speed sensors. One such technique uses an open paddlewheel construction, in which four paddles are each supported by arms which define an open space between the paddle and the wheel shaft. Another such technique employs a waterwheel having a plurality of buckets, closed at their side, and recessed in the peripheral edge of the wheel. The slot within which the wheel rotates is open on the downstream side. This provides a relief space which prevents a buildup of pressure on the downstream side, which would vary the rotational characteristics of the wheel in a non-linear manner.

Another problem with paddlewheel speed sensors is that a significant amount of "jitter" exists in the paddlewheel rotational speed. Jitter is an oscillation in rotational speed attributable to the turbulent flow present in the paddlewheel cavities at nearly all speeds, and is even present when the vessel velocity is quasi-constant.

SUMMARY

A correction circuit for a paddlewheel speed sensor producing a speed signal with a known pulse rate, i.e., the number of pulses/sec produced by the sensor divided by the speed of the vessel in nautical miles per hour (knots). This should be a constant in a linear sensor, i.e., increase or decrease linearly with the speed of the vessel. A signal processor is provided which processes the sensed signal and corrects any non-linearities generated by the sensor in accordance with an algorithm stored in memory. The algorithm corrects for non-linearities in the pulse rate to produce a pulse stream having a constant pulse rate, and also reduces pulse-to-pulse variations. The circuit may also standardize the pulse stream to a standard rate.

In some implementations, the algorithm performs a polynomial curve fit of the actual pulse rate of the sensor versus the true speed of the vessel (separately determined) to transform the actual pulse rate into a corrected pulse rate. In other implementations, a microcontroller performs a linear piecewise approximation, or compares the actual pulse rate of the sensor versus the (a priori) true speed of the vessel to transform the actual pulse rate into a corrected pulse rate.

The sensor can be provided with GPS information, engine speed if the vessel is a motor vessel, and/or wind speed from a wind speed indicator to provide information used to transform the sensed pulse rate into a linearly corrected pulse rate.

In certain embodiments, the algorithm is used to minimize jitter by modifying the output data by discarding paddlewheel interpulse times that exceed maximum limits based on the theoretically known maximum acceleration and deceleration rates of the vessel. The limits can be implemented in a look-up table or algorithm.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6B is a diagram of a microprocessor correction circuit in accordance with an embodiment of the invention.

DETAILED DESCRIPTION OF THE INVENTION

A description of preferred embodiments of the invention follows.

Paddlewheel sensors are used to detect a marine vessels speed. The sensors can be transom mounted or thru-hull mounted to the marine vessel. Examples of such sensors are described in U.S. Pat. Nos. 4,898,020, 4,836,020, and Re. 33,982, and U.S. patent application Ser. No. 10/630,625, filed Jul. 30, 2003, incorporated by reference in their entireties.

The paddlewheel can be formed of amorphous magnetized material, such as barium ferrite. The paddlewheel can have a plurality of paddles extending from a central hub, the entirety of which rotates about a shaft when the vessel traverses water. The paddles can be polarized with respect to the hub or with respect to each other. A coil or Hall-effect device can be mounted in close proximity to the paddlewheel. The Hall-effect device senses a variation in the magnetic field as the paddles rotate. In some embodiments, the sensor can include a sonic transducer assembly for depth measurements, a thermal sensing device for temperature measurements, or any combination thereof. The Hall-effect device, the sonic transducer assembly, and the thermal sensing device are typically electrically coupled to a speed display, a depth indicator display, and a temperature display located, for example, in a cockpit or helm of the vessel. The Hall-effect device, the sonic transducer assembly, and the thermal sensing device can be of the types described in U.S. Pat. No. 4,555,938, the entire contents of which are incorporated herein by reference.

Typically, the sensor is calibrated before use by placing the sensor in a tow tank or mounting the sensor to a boat. Then under conditions when the speed is known, a priori or is fixed, a pulse rate (Hz/knot) of the sensor is determined. Once the pulse rate of the sensor is determined, the vessel speed can be determined by counting the number of paddlewheel pulses over a preset time period.

Figure 1:
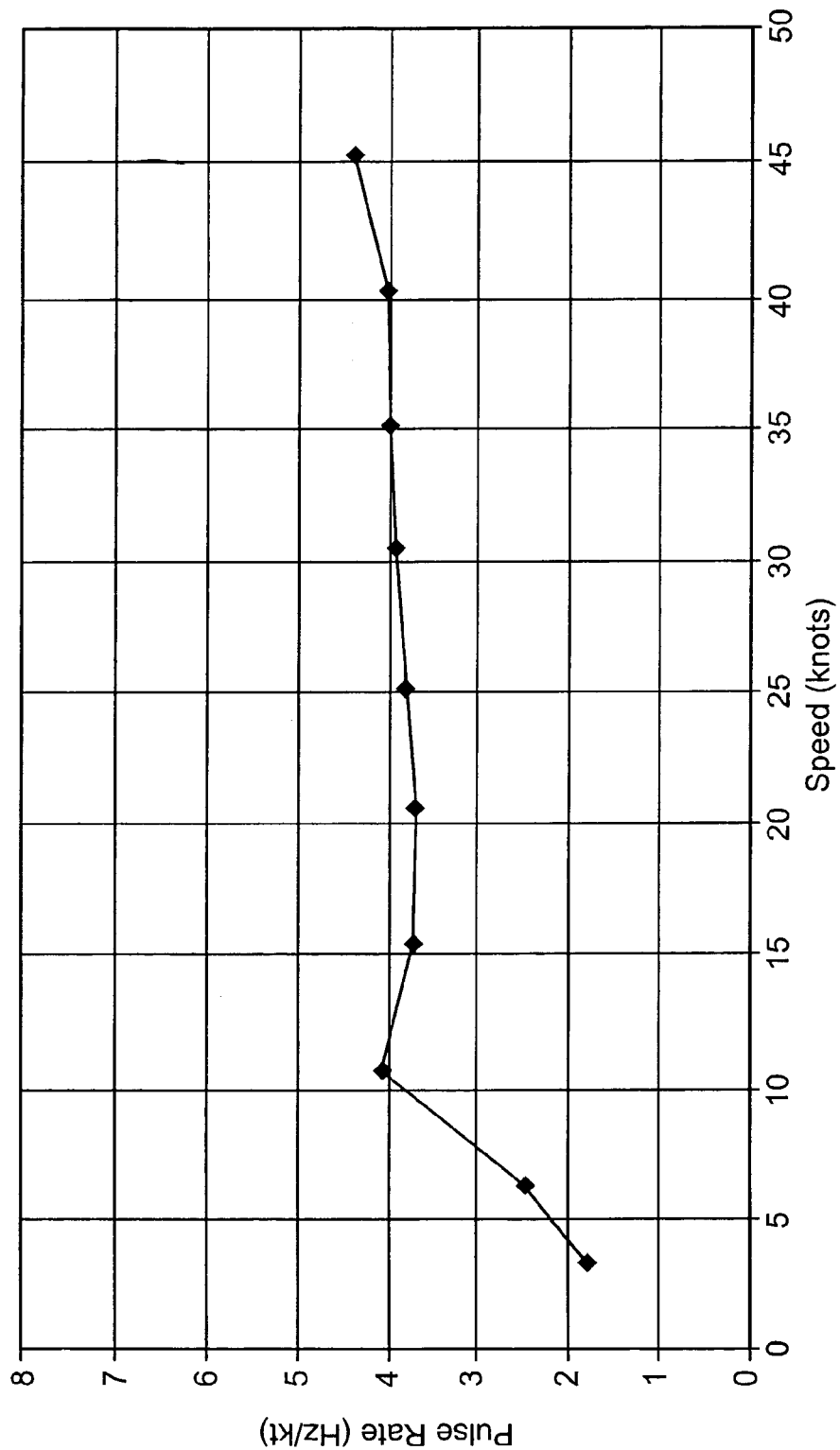
FIG. 1 is a plot of pulse rate (Hz/kt) versus vessel speed (knots) of a transom mounted speed sensor with a four-blade paddlewheel.
Figure 2A:
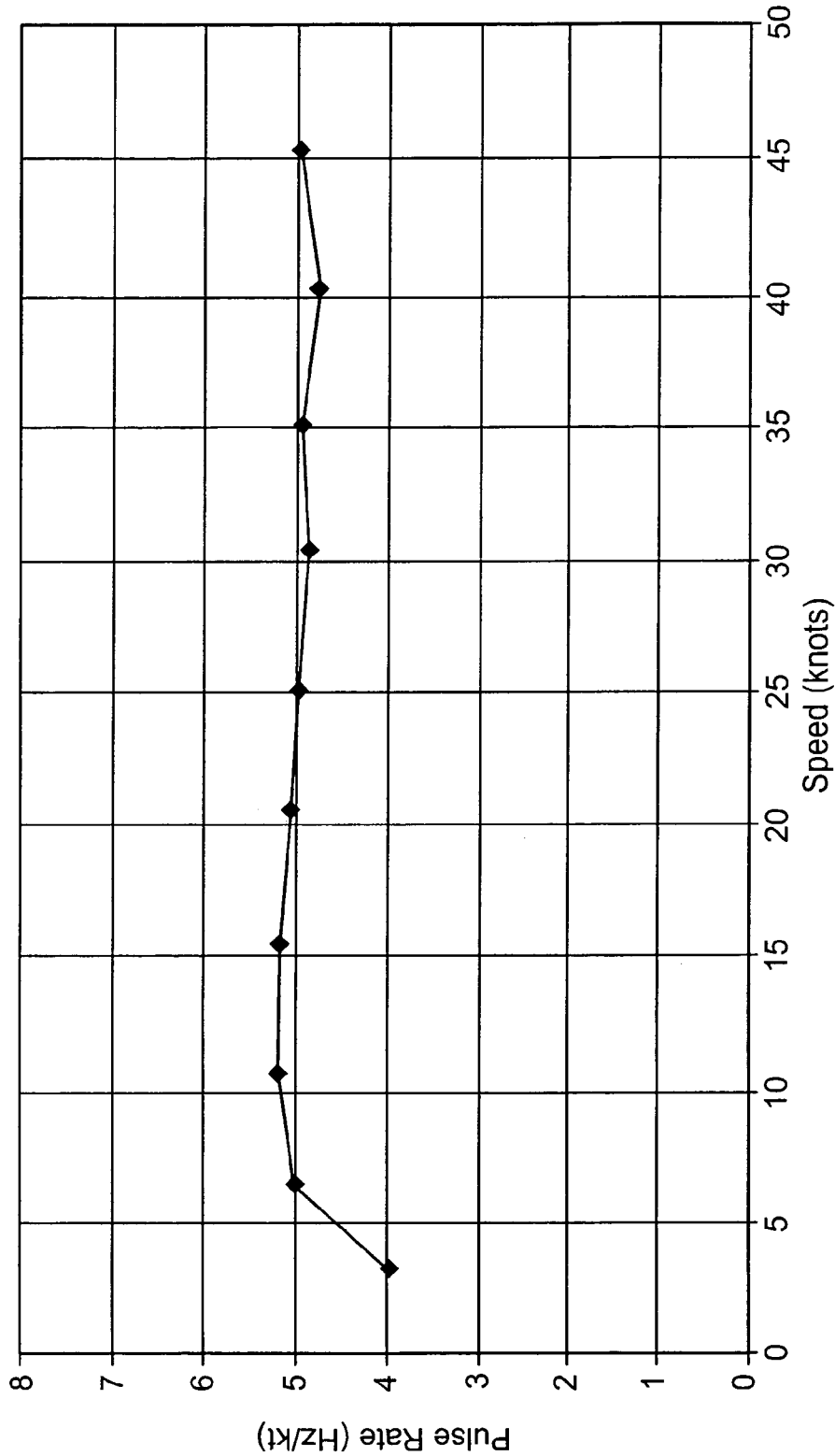
FIG. 2A is a plot of pulse rate (Hz/kt) versus vessel speed (knots) for high speeds of a thru-hull mounted speed sensor with a four-blade paddlewheel.
Figure 2B:
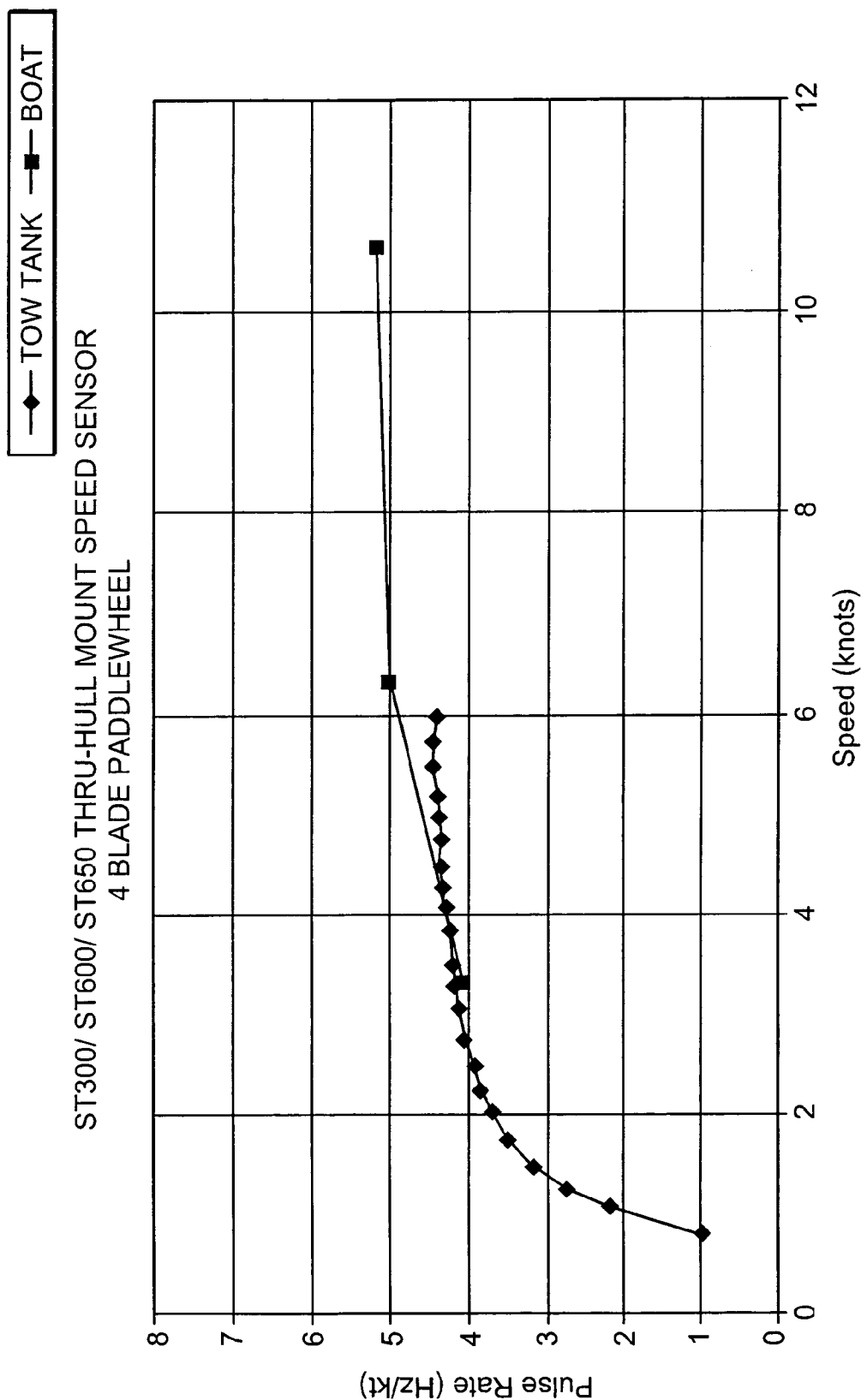
FIG. 2B is a plot of pulse rate (Hz/kt) versus vessel speed (knots) for low speeds of a thru-hull mounted speed sensor with a four-blade paddlewheel, where the circles represent data taken in a tow tank, and the squares represent data taken with a boat.

A perfectly linear paddlewheel sensor will have the same pulse rate (Hz/knot) over the entire speed range of the vessel. However, most if not all paddlewheels exhibit some non-linear behavior as shown in FIGS. 1–2B. FIG. 1 shows the behavior of a transom mounted speed sensor with a four-blade paddlewheel. FIG. 2A shows the behavior of a thru-hull mounted sensor with a four-blade paddle wheel for high speeds and FIG. 2B shows the behavior of a thru-hull mounted sensor with a four-blade paddle wheel for low speeds. In each of these examples as shown in FIGS. 1–2B, the pulse rate drops off at very low speeds because of the thickening of the boundary layer near the sensor and the low driving force applied to the paddles. FIG. 1 further shows that transom mounted paddlewheels typically read too high at high speeds.

Figure 3A:
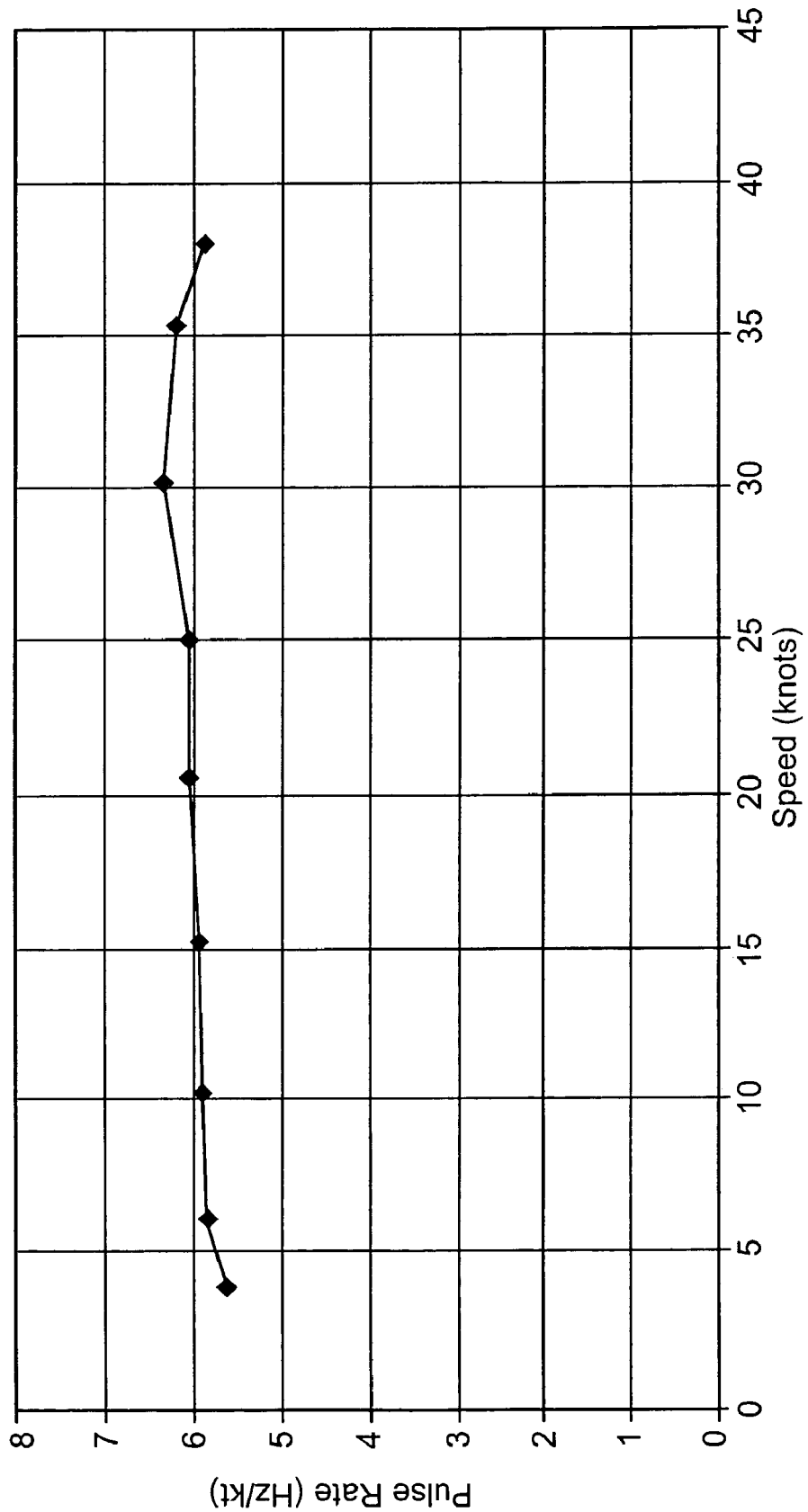
FIG. 3A is a plot of pulse rate (Hz/kt) versus vessel speed (knots) of an alternative thru-hull mounted speed sensor with a four-blade paddlewheel without a fairing.
Figure 3B:
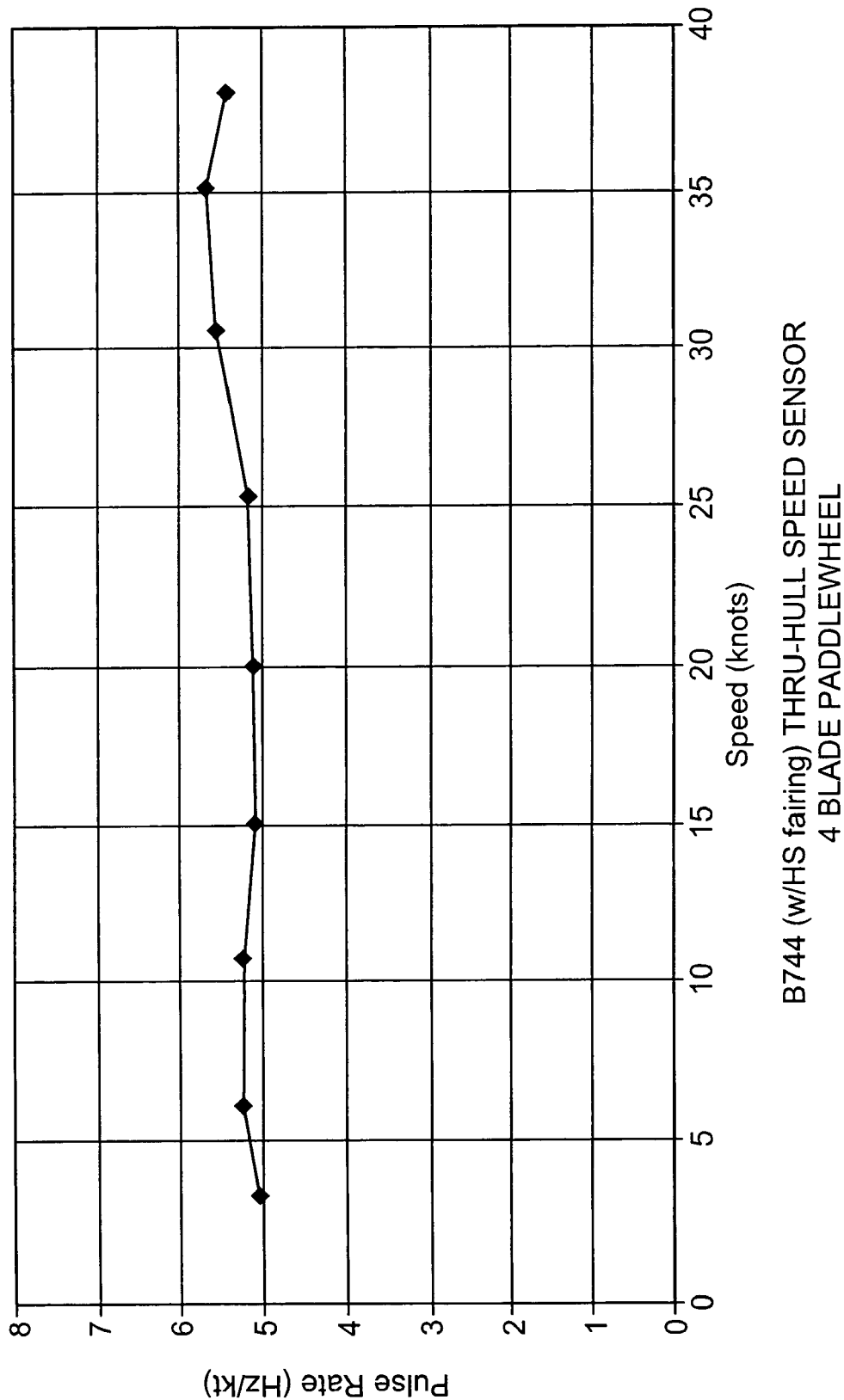
FIG. 3B is a plot of pulse rate (Hz/kt) versus vessel speed (knots) of the alternative thru-hull mounted speed sensor with a four-blade paddlewheel with a fairing.

FIG. 3A shows the behavior of a thru-hull mounted speed sensor with a four-blade paddlewheel without a fairing and FIG. 3B shows the behavior of a thru-hull mounted speed sensor with a four-blade paddlewheel a fairing to minimize the turbulence around the sensor. In each of theses examples as shown in FIGS. 3A–3B, the thru-hull paddlewheel design is fairly linear up to a speed around 25 knots. However, beyond speeds of 25 knots the sensor exhibits non-linear behavior.

Other approaches have been developed for measuring vessel speeds to correct the non-linear behavior of the speed sensors. One such approach measures the time between sequential pulses, known as "interpulse time," to compute the vessels speed. Most paddlewheels generate between one and four pulses per complete revolution and generate about 5 pulses per knot of vessel speed. Therefore, sailboats typically have about 5–50 pulses per second and power boats typically have about five to about 300 pulses per second.

Figure 4:
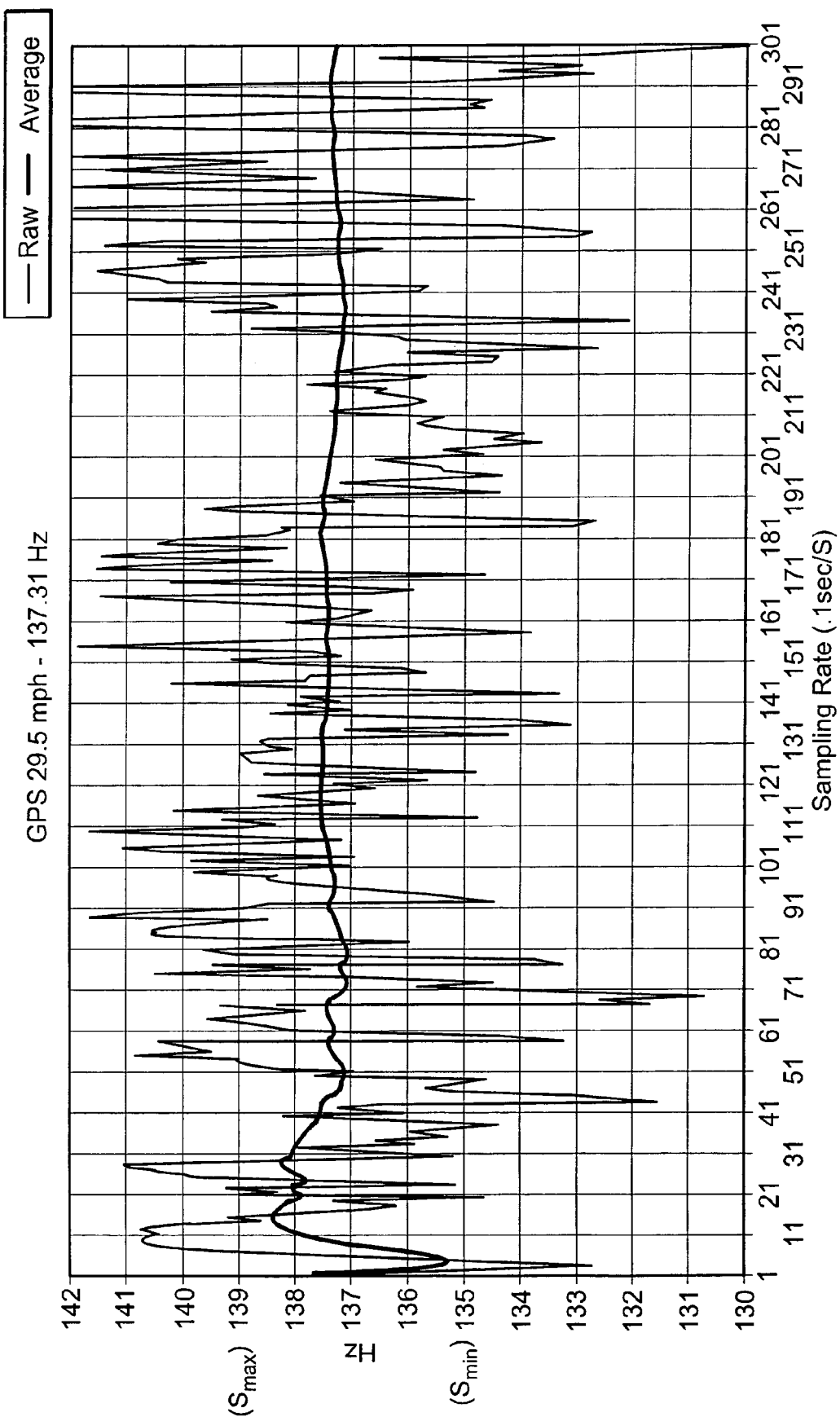
FIG. 4 is a plot of the velocity fluctuations, or jitter, of a paddlewheel speed sensor.

However, as shown in FIG. 4, paddlewheel jitter becomes apparent when measuring the interpulse time. FIG. 4 shows the variation in the pulse stream over a time period. These pulse-to-pulse variations appear even though the vessels is traveling at a constant speed, for example, of 29.5 mph. At this speed, the sensor should be producing a pulse stream of 137.31 Hz. However, for example, at 1.1 sec, the sensor detects a pulse stream of 140.5 Hz, while at 2.1 sec, the sensor detects 134.5 Hz.

The jitter is probably attributable to the complex turbulent flow occurring in the paddlewheel cavity. The jitter is thought to stem from flow instability as the fluid passes over the paddlewheel, especially within the paddlewheel cavity. This instability causes oscillations in local pressure in the paddlewheel cavity and variations in paddlewheel rpm.

As shown in FIGS. 1–3B, the three different speed sensors produce different pulse rates. When the sensors are shipped from an OEM's factory, they are configured to an "average" pulse rate. Ideally, the customer should not have to recalibrate the sensor. However, in some instances, the customer has to recalibrate the sensor for its particular use. As such, most sensors have calibration capability, and can accommodate a wide range of pulse rates (Hz/knot). However, recalibration by the end user can be eliminated or minimized by having a standardized pulse rate.

Figure 5:
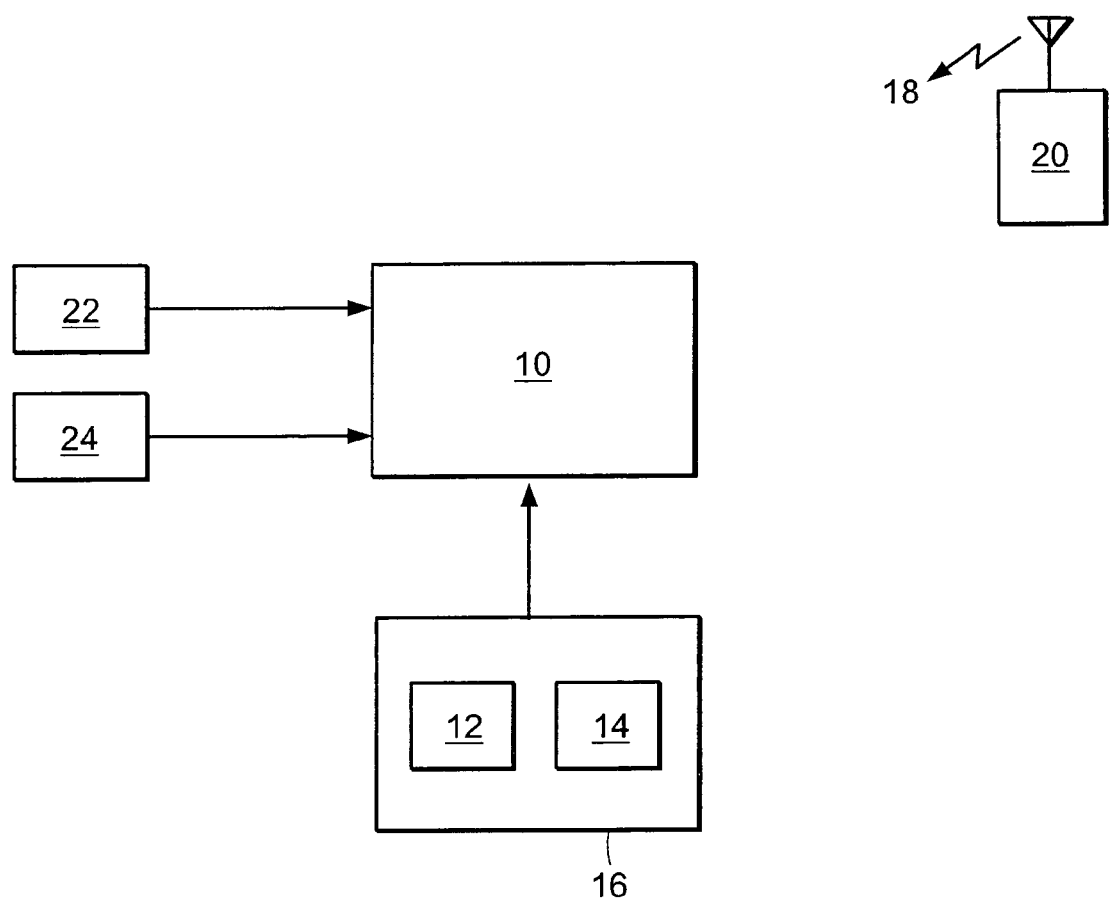
FIG. 5 is a block diagram of a correction circuit in accordance with the invention.

As shown in FIG. 5, the present embodiment addresses linearity correction, pulse rate standardization, and jitter reduction by embedding a signal processor or microcontroller 10 inside a paddlewheel speed sensor. The microcontroller 10 can correct the non-linear behavior of the sensor pulse rate, as shown in FIGS. 1–3, looking up values in a correction table 12 or algorithm 14 stored in a memory 16. In some embodiments, the microcontroller 10 can receive input signals 18 related to the speed of the vessel from a global positioning system (GPS) 20. Optionally, or additionally, the microprocessor 10 can receive engine speed (rpm) data 22 from the vessel's engine or engines. The rpm data can be used to correct the non-linear behavior of the sensor pulse rate because boat speed is proportional to the engine's rpm. The change in an engine's rpm occurs before and increase or decrease in vessel speed is detected. In other embodiments, a speed indicator 24 can supply speed information to the microcontroller 10.

A particular feature of locating the microcontroller 10 inside the paddlewheel device is that the characteristics of the paddlewheel are known since the paddlewheel and electronics are unitary. However, the microcontroller 10 and other signal processing devices can be-located external to the sensor. In either case, the sensor can be reprogrammable, for example, the characteristics of the vessel's hull can be input into the processor and changed at any time.

Jitter, from experimental measurements, occurs at a much higher magnitude than would be predicted by estimating the maximum rate of acceleration or deceleration possible on a specific vessel. Thus, if the maximum rate of acceleration and deceleration of a vessel in normal conditions is computed theoretically or measured experimentally, limits can be set on the maximum amount of jitter as a function of speed. For purposes of illustration, as shown in FIG. 4, the upper limit ($S_{max}$) can be about 139 Hz and the lower limit ($S_{min}$) about 135 Hz. Note that these limits are indicated by way of example only. The actual limits would depend on the vessel. If jitter beyond these limits is observed, one or a combination of various methods can be used to correct the data, for example: 1) Discard the paddlewheel interpulse times that exceed the maximum limits established; 2) Truncate the interpulse time to the maximum established for the dynamics of the vessel; 3) Feed the interpulse time into a filtering algorithm, such as a Kalman filter.

Using the described approach would significantly improve the paddlewheel jitter reduction without introducing a sluggish response to changes in boat speed. One of the benefits of this would be much improved speed control of powerboats, similar to cruise control on automobiles. For example, speed control is desirable in certain water sports, such as water skiing, where tow speed needs to be maintained around +/−0.5 mph. Similarly, sailors would benefit from a more stable speed measurement without sacrificing response time.

Some benefits obtained from measuring interpulse times are:

1) A lot of interpulse data is produced at high speeds.
2) The processed data can be smoothed by averaging algorithms to stabilize response. For example, the last eight interpulse times can be used in a "boxcar" averaging approach to set the acceptance limits for the next interpulse time.
3) The interpulse time or the averaged interpulse time can be scaled to obtain a standard output rate. For example, all paddlewheel sensors in a product line can be scaled to have/ an identical pulse rate.
4) Interpulse times can be corrected by multipliers to correct for non-linearity.

In one embodiment, as shown in FIG. 6B, a correction circuit 30 can be implemented using a microcontroller 10, such as the PIC12F629. The correction circuit 30 can be designed to correct paddlewheel non-linearities, such that the output is a pulse stream with a frequency corresponding to a standard rate of 5.555 Hz per Knot (corresponding to 20,000 pulses per nautical mile). Moreover, the correction circuit 30 reduces the pulse-to-pulse variations (jitter) without excessively increasing time lag so that the pulse rate output can be used in a "Cruise-Control" feedback loop without introducing oscillations in speed.

Figure 6A:
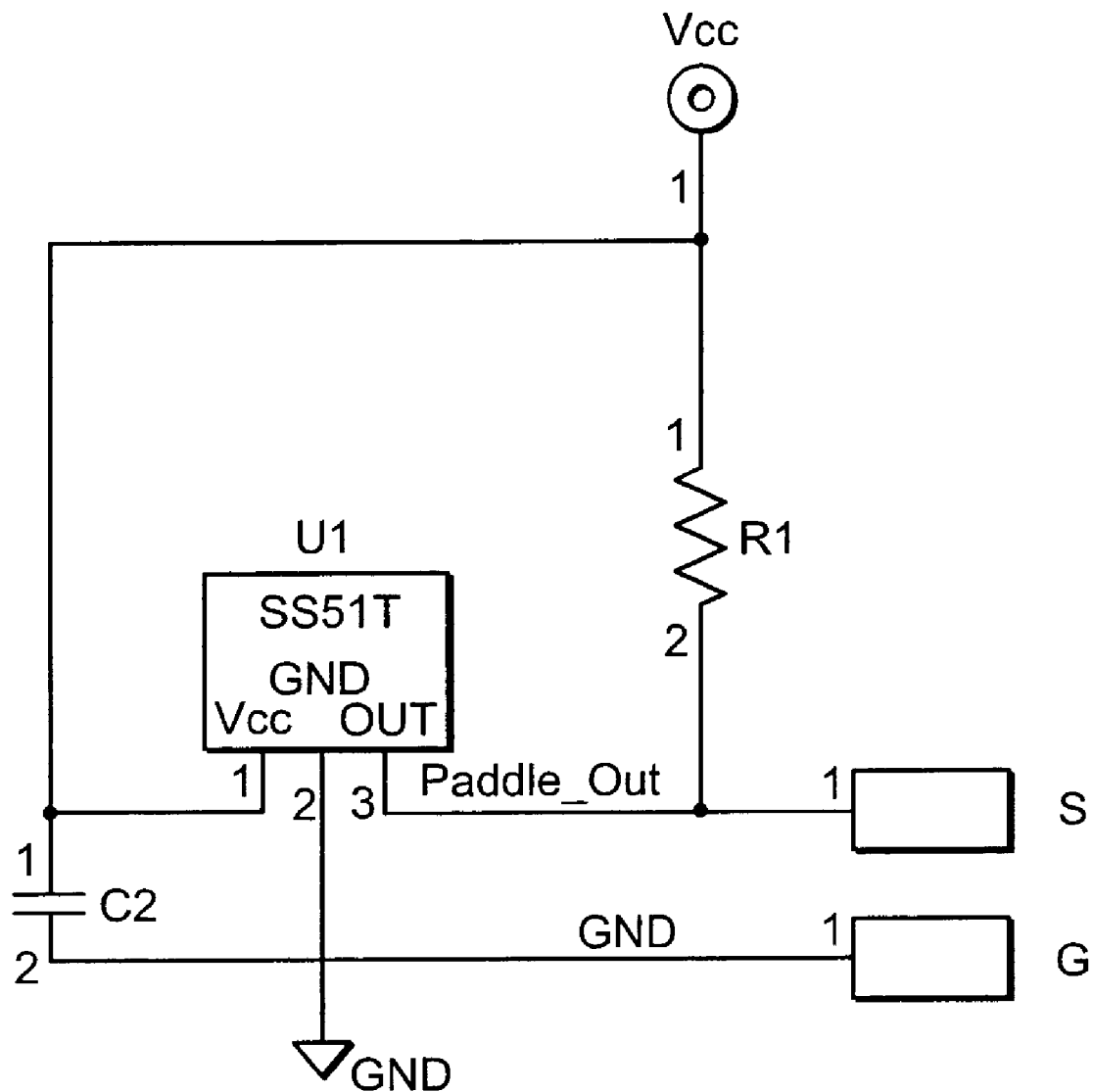
FIG. 6A is a diagram of an uncorrected paddlewheel circuit.

A Hall Cell 32 (at U1) can be of the type used in standard paddlewheel configurations. In the standard configuration, as shown in FIG. 6A, the Hall Cells 32 output signal 38 is sent back to the user. However, in the embodiment of FIG. 6B the output signal is sent to the microprocessor 10, which applies a smoothing algorithm and a correction algorithm to compute the vessels true speed. After which, the microprocessor 10 regenerates the signal as a series of smoothed pulses which drive transistor 34 (at Q1) to create a pulsed signal 40 which is displayed to the user as the correct speed. This newly created pulsed signal 40 looks identical to output signal from the Hall Cell 32, except the signal 40 has been corrected, and there is far less jitter.

Figure 6C:
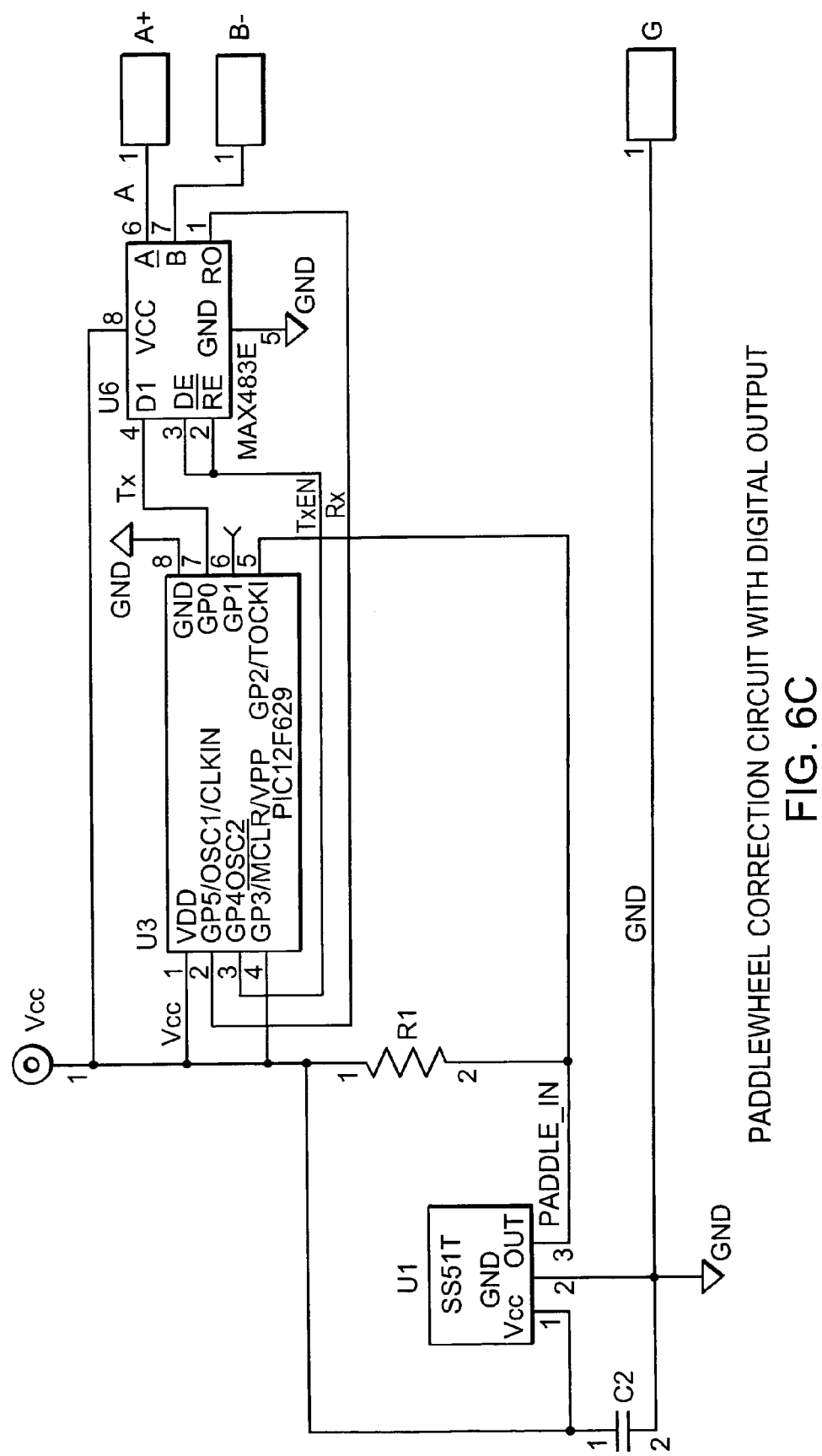
FIG. 6C is a diagram of a microprocessor correction circuit in accordance with another embodiment of the invention.

In another embodiment, as shown in FIG. 6C, the transistor 34 (FIG. 6B) is replaced by an RS-485 driver circuit 36, such as the MAX483E/SO U6, and can be used to create corresponding NMEA messages (data protocol) from values sent by the microprocessor 10. The message data is a differential signal A+/B− which can be digitally transmitted to the user. In one example, the speed data can be updated at ten readings per second, which would provide a Cruise Control circuit frequent enough updates for its feedback control.

The Speed Correction Algorithm is as follows:

For a particular paddlewheel, the actual pulse rate (Hz per Knot) varies in a predictable fashion from, for example, a "standard" rate of 5.555 Hz per knot, which corresponds to 20,000 pulses per nautical mile. Therefore, the actual pulse rate can be standardized to the standard pulse rate. In general, the paddlewheel reads "slow" at slow speeds (below 5 Kts) and reads "high" at high speeds (above 40 Kts), although each configuration has its own curve. The actual pulse rate can be corrected by performing a polynomial curve fit to transform the actual speed into the corrected speed by comparing the curve of the actual pulse rate versus true speed for any given paddlewheel. Two or more polynomial curves can be used in preforming the transformation will provide better accuracy. In the instance where more polynomial curves are used, the polynomial curves will be to be joined at predefined speed. The correct speed is provided by the expression:

$$Y=ax^n+bx^{n-1}+ \ldots +gx+h$$

where x represents the measured speed, a, b, . . . , g, and h are the nth order polynomial coefficients. Alternatively, the actual pulse rate can be corrected using a piecewise linear approximation based on the actual pulse rate versus true speed for any given paddlewheel. The polynomial curve fit is efficient with respect to microprocessor memory requirements. Further, the actual pulse rate can be corrected using a lookup table based on the actual pulse rate versus true speed for any given paddlewheel.

The Jitter Reduction Algorithm is as follows:

One way to reduce jitter is to average the interpulse data over a long period of time. While this average produces a smooth output, it also introduces a significant delay (as much as 4–5 seconds). This delay can cause a cruise control circuit to oscillate. Further, the delay is too slow of a response time in some applications. To address this problem, the present embodiment involves several aspects:

a. A significant amount of jitter is due to the non-random variations in the magnetic strength and spacing of each paddle. To eliminate this source of jitter, the complete revolutions of the paddlewheel are counted. For example, if there are four paddles, and the paddles alternate North-South-North-South magnetically (i.e. the standard configuration), then the output of the Hall Cell would be a waveform which goes high-low-high-low, or two complete cycles. However, this count represents one revolution of the paddlewheel, so the count is one "1". The effective Hz per Knot needs to be halved to correct the count. This can be accomplished using the Speed Correction Algorithm detailed above.

b. The remaining jitter is more random in nature, and less well understood, although it probably is hydrodynamic in nature. Based on measurements, the amplitude of the jitter (revolution-to-revolution variation) appears to increase approximately linearly with speed. Thus, for example, at 40 Knots, the indicated speed variation from revolution-to-revolution may be +/−10 Knots. In particular embodiments, for a particular hull and engine, one knows, a priori, that the actual speed variation due to acceleration or deceleration must be limited. Knowing this fact, the average speed is computed, $S_a$, (say, over the last n revolutions). Further, if the maximum acceleration from sample-to-sample can produce a speed $S_{max}$, and the maximum deceleration from sample-to-sample can produce a speed $S_{min}$ Then if S, lies between $S_{max}$ and $S_{min}$, $S_a$ is used, if $S_a$ lies above $S_{max}$, $S_{max}$ is used, and if S, lies below $S_{min}$, $S_{min}$ is used. This operation is known as "clipping". The resulting data still has jitter, but much lower in amplitude. The remaining jitter can be smoothed by averaging a much smaller number of samples, resulting in much smaller delay.

c. Since the jitter observed appears to be proportional to the vessels speed, the optimum smoothing occurs when the pulse rate is averaged over a fixed time period, rather than a fixed number of paddlewheel pulses. For example, suppose a particular paddlewheel exhibits an uncorrected output of 4 Hz per Knot. If the vessel is traveling at 5 Knots, the pulse rate is 20 pulses per second. Then, averaging over 0.5 seconds, the last 10 pulses would be used in the average. Alternatively, if the vessel is traveling at 40 Knots, the pulse rate is 160 pulses per second. Then, averaging over 0.5 seconds, the last 80 pulses would be used in the average.

d. In another embodiment, speed signal conditioning can be obtained in power boats if the rpm of the engine or engines is input to the speed sensor. The clipping algorithm is based on the dynamics of the boat and its acceleration and deceleration characteristics. In a cruise control mode, the speed of the engine varies only enough to control the speed of the vessel. If the engine rpm is known as a function of time, or if a message was transmitted to the sensor that the engine is in cruise control mode, then more clipping can be used to achieve more jitter reduction. Similar information can be provided by a speed indicator, such as wind indicators used in sailboats.

e. In another embodiment, dynamically adjusting the parameters can be used to reduce jitter. For example, if it is detected that the boat is accelerating (either by monitoring engine rpm, or monitoring changes in the average speed (e.g. the first derivative of speed), and increase $S_{max}$ occurs during this time. The smoothed speed would more closely track the actual speed during acceleration. Then, when the boat is no longer accelerating, the window can be shut down to provide less jitter. Similarly, $S_{min}$ can be reduced during deceleration.

f. $S_{max}$ and $S_{min}$ may be functions of current speed, engine rpm, acceleration/deceleration, hull characteristics, and engine performance characteristics, etc. These functions can be implemented in a table look-up, or equation form. Basic constants can be stored in non-volatile RAM, and be programmable for different configurations.

Figure 7:
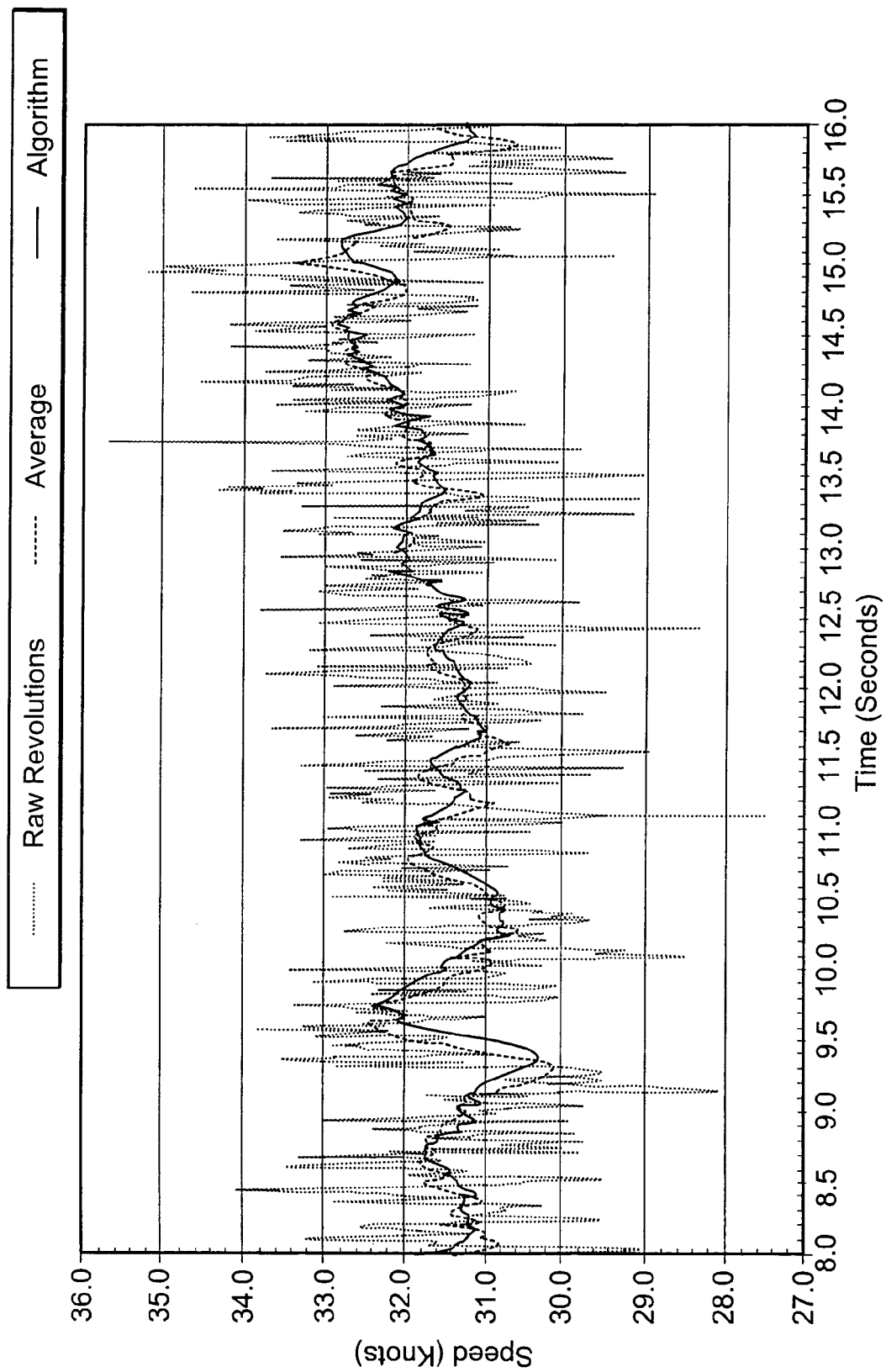
FIG. 7 illustrates a comparison of averaging jitter data versus smoothing the jitter data with an algorithm in accordance with the invention.

In another embodiment, the jitter algorithm can use between the last 1–40 revolutions of the paddle to determine the average speed. Clipping occurs if the current sample varies by more than (+/−Average/128), for ease of implementation. Then, the data is averaged up to the 1–40 of these clipped values (depending on speed) to produce the smoothed, uncorrected speed. This average is applied to the correction polynomial to generate the corrected speed. The pulse rate corresponding to the corrected speed is computed, and the microprocessor outputs the appropriate pulses. In actuality, the entire algorithm can be computed in the time domain, with inter-pulse period (to be output by the microprocessor) as the desired output. FIG. 7 shows a comparison of the raw speed data (per revolution), averaged speed data (for example, the last 16 revolutions), and the data smoothed with the present algorithm.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of measuring the speed of a marine vessel with a speed sensor having a known pulse rate comprising the steps of: substantially correcting non-linearities in the pulse rate so that the sensor produces a pulse stream output having a substantially constant pulse rate per unit of speed; reducing pulse-to-pulse variations of the pulse stream wherein the step of correcting includes performing a polynomial curve fit of an actual pulse rate of the sensor versus the true speed of the vessel to transform the actual pulse rate to a corrected pulse rate.

2. The method of claim 1, wherein the step of frequency correcting includes standardizing the pulse stream output to have a pulse rate corresponding to a standard pulse rate.

3. The method of claim 1, wherein the step of correcting includes performing a linear piecewise approximation to an actual pulse rate of the sensor versus the true speed of the vessel to transform the actual pulse rate to a corrected pulse rate.

4. The method of claim 1, wherein the step of correcting includes using a lookup table to based on an actual pulse rate of the sensor versus the true speed of the vessel to transform the actual pulse rate to a corrected pulse rate.

5. The method of claim 1, wherein the step of correcting includes comparing the actual pulse rate of the sensor versus the true speed of the vessel to transform the actual pulse rate to a corrected pulse rate.

6. The method of claim 1, wherein the step of correcting includes providing vessel speed information from a global positioning satellite to transform the actual pulse rate to a corrected pulse rate.

7. The method of claim 1, wherein the vessel is a motor vessel, and the step of correcting includes providing engine speed to transform the actual pulse rate to a corrected pulse rate.

8. The method of claim 1, wherein the sensor is a paddlewheel sensor, and the step of reducing includes counting complete revolutions of the paddlewheel.

9. The method of claim 8, wherein a range of the last 1–40 revolutions counted are used in the step of reducing.

10. The method of claim 8, wherein the step of reducing includes clipping output data associated with the pulse rate.

11. The method of claim 10, wherein the clipping includes discarding paddlewheel interpulse times that exceed maximum limits based on the maximum acceleration and deceleration of the vessel.

12. The method of claim 11, wherein the step of reducing includes averaging the pulse rate over a fixed time period.

13. The method of claim 11, wherein the vessel is a motor vessel, and the step of reducing includes providing engine speed as a function of time.

14. The method of claim 11, wherein the step of reducing includes detecting changes in the vessel's acceleration and deceleration and adjusting the maximum limits to correspond to the changes in the vessel's acceleration and deceleration.

15. The method of claim 11, wherein the limits are implemented in a look-up table.

16. A method for providing speed signals linearly proportional to the speed of a marine vessel through water comprising: generating the speed signals in the form of electrical pulses at a rate which is generally constant per distance traveled by the vessel over a specified time period; correcting for any variations in the rate by processing the signals in accordance with an algorithm stored in a memory; and further comprising performing a polynomial curve fit of an actual pulse rate of the sensor versus the true speed of the vessel to transform the actual pulse rate to a corrected pulse rate.

17. The method of claim 16 wherein the step of correcting includes discarding interpulse times that exceed maximum limits based on the maximum acceleration and deceleration of the vessel.

18. The method of claim 17 further comprising detecting changes in the vessel's acceleration and deceleration and adjusting the maximum limits to correspond to the changes in the vessel's acceleration and deceleration.

19. The method of claim 16, further comprising standardizing the rate of the electrical pulses to a standard pulse rate.

20. A correction circuit for a paddlewheel speed sensor producing a speed signal with a known pulse rate comprising: a signal processor for processing the speed signal; a memory for storing an algorithm, the algorithm substantially correcting non-linearities in the pulse rate to produce a pulse stream having a constant pulse rate, and reducing pulse-to-pulse variations; and wherein correcting includes using at least one polynomial curve of the actual pulse rate, performing a polynomial curve fit to transform the actual pulse rate into a corrected speed by comparing the polynomial curve of the actual pulse rate versus true speed of the vessel.

21. The circuit of claim 20, wherein the correction circuit standardizes the pulse stream with a pulse rate corresponding to a standard pulse rate.

22. A method of correcting a sensed speed of a marine vessel, comprising: standardizing an actual pulse rate of the vessel to a standard pulse rate; and wherein the step of standardizing includes using at least one polynomial curve of the actual pulse rate, performing a polynomial curve fit to transform the actual pulse rate into a corrected speed by comparing the polynomial curve of the actual pulse rate versus true speed of the vessel.

23. The method of claim 22, wherein one polynomial curve is for low speeds and another polynomial curve is for high speeds.

24. The method of claim 22, wherein the polynomial curves are joined at a predefined speed.

25. The method of claim 22, wherein the step of standardizing includes performing a linear piecewise approximation to the actual pulse rate of the sensor versus the true speed of the vessel to transform the actual pulse rate to a corrected pulse rate.

26. The method of claim 22, wherein the step of standardizing includes using a lookup table to based on the actual pulse rate of the sensor versus the true speed of the vessel to transform the actual pulse rate to a corrected pulse rate.

27. The method of claim 22, wherein the standard pulse rate is 5.555 Hz per knot.

28. A speed sensor for detecting the speed of a marine vessel, comprising:
    a circuit for correcting non-linearities associated with the speed sensor; and driver means for displaying a corrected speed of the marine vessel; and wherein correcting includes using at least one polynomial curve of the actual pulse rate, performing a polynomial curve fit to transform the actual pulse rate into a corrected speed by comparing the polynomial curve of the actual pulse rate versus true speed of the vessel.

29. A method of measuring the speed of a marine vessel with a speed sensor having a known pulse rate comprising the steps of:
    substantially correcting non-linearities in the pulse rate so that the sensor produces a pulse stream output having a substantially constant pulse rate per unit of speed; and reducing pulse-to-pulse variations of the pulse stream, wherein the step of correcting includes performing a linear piecewise approximation to an actual pulse rate of the sensor versus the true speed of the vessel to transform the actual pulse rate to a corrected pulse rate.

30. A method of correcting a sensed speed of a marine vessel, comprising:
    standardizing an actual pulse rate of the vessel to a standard pulse rate, wherein the step of standardizing includes performing a linear piecewise approximation to the actual pulse rate of the sensor versus the true speed of the vessel to transform the actual pulse rate to a corrected pulse rate.

* * * * *